United States Patent
Furuya et al.

(10) Patent No.: US 10,396,348 B2
(45) Date of Patent: Aug. 27, 2019

(54) NEGATIVE ELECTRODE MATERIAL FOR NON-AQUEOUS ELECTROLYTE SECONDARY BATTERY, METHOD OF PRODUCING NEGATIVE ELECTRODE MATERIAL FOR NON-AQUEOUS ELECTROLYTE SECONDARY BATTERY, AND NON-AQUEOUS ELECTROLYTE SECONDARY BATTERY

(71) Applicant: SHIN-ETSU CHEMICAL CO., LTD., Tokyo (JP)

(72) Inventors: Masahiro Furuya, Takasaki (JP); Kohta Takahashi, Takasaki (JP); Hiroki Yoshikawa, Takasaki (JP); Hiromichi Kamo, Takasaki (JP); Takakazu Hirose, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 244 days.

(21) Appl. No.: 15/112,084

(22) PCT Filed: Jan. 20, 2015

(86) PCT No.: PCT/JP2015/000218
§ 371 (c)(1),
(2) Date: Jul. 15, 2016

(87) PCT Pub. No.: WO2015/115055
PCT Pub. Date: Aug. 6, 2015

(65) Prior Publication Data
US 2016/0336585 A1   Nov. 17, 2016

(30) Foreign Application Priority Data
Jan. 31, 2014   (JP) .................................. 2014-017555

(51) Int. Cl.
*H01M 4/134* (2010.01)
*H01M 4/1395* (2010.01)
(Continued)

(52) U.S. Cl.
CPC ......... *H01M 4/134* (2013.01); *H01M 4/0402* (2013.01); *H01M 4/133* (2013.01);
(Continued)

(58) Field of Classification Search
CPC .... H01M 4/133; H01M 4/134; H01M 4/1393; H01M 4/1395; H01M 4/0402;
(Continued)

(56) References Cited

U.S. PATENT DOCUMENTS 5,395,711 A   3/1995   Tahara et al.
6,383,686 B1   5/2002   Umeno et al.
(Continued)

FOREIGN PATENT DOCUMENTS

CN   102969528 A   3/2013
CN   103081188 A   5/2013
(Continued)

OTHER PUBLICATIONS

May 16, 2017 Office Action issued in Japanese Patent Application No. 2014-017555.
(Continued)

*Primary Examiner* — Osei K Amponsah
(74) *Attorney, Agent, or Firm* — Oliff PLC

(57) ABSTRACT

The present invention is directed to a negative electrode material for a non-aqueous electrolyte secondary battery, including a conductive powder composed of silicon-based active material particles coated with a conductive carbon film, in which the conductive carbon film exhibits a d-band having a peak half width of 100 cm$^{-1}$ or more as determined from a Raman spectrum of the conductive carbon film. The (Continued)

invention provides a negative electrode material for a non-aqueous electrolyte secondary battery that has excellent cycle performance and keeps high charge and discharge capacity due to use of a silicon-based active material, a method of producing the negative electrode material for a non-aqueous electrolyte secondary battery, and a non-aqueous electrolyte secondary battery.

7 Claims, 2 Drawing Sheets

(51) Int. Cl.
| | |
|---|---|
| H01M 4/04 | (2006.01) |
| H01M 4/48 | (2010.01) |
| H01M 4/62 | (2006.01) |
| H01M 4/133 | (2010.01) |
| H01M 4/1393 | (2010.01) |
| H01M 10/0525 | (2010.01) |
| H01M 4/36 | (2006.01) |
| H01M 4/587 | (2010.01) |
| H01M 4/02 | (2006.01) |

(52) U.S. Cl.
CPC ....... *H01M 4/1393* (2013.01); *H01M 4/1395* (2013.01); *H01M 4/366* (2013.01); *H01M 4/483* (2013.01); *H01M 4/625* (2013.01); *H01M 10/0525* (2013.01); *H01M 4/587* (2013.01); *H01M 2004/027* (2013.01)

(58) Field of Classification Search
CPC .. H01M 4/483; H01M 4/625; H01M 10/0525; H01M 2004/027
See application file for complete search history.

(56) References Cited

U.S. PATENT DOCUMENTS

| | | | |
|---|---|---|---|
| 7,358,011 B2* | 4/2008 | Fukuoka | H01M 4/0428 429/128 |
| 2003/0129494 A1 | 7/2003 | Kaneda et al. | |
| 2007/0092796 A1* | 4/2007 | Matsuda | H01M 4/38 429/217 |
| 2007/0264574 A1 | 11/2007 | Kim et al. | |
| 2012/0077087 A1 | 3/2012 | Cho et al. | |
| 2012/0288742 A1 | 11/2012 | Tanaka et al. | |
| 2013/0052508 A1 | 2/2013 | Kim et al. | |
| 2013/0136988 A1 | 5/2013 | Tanaka et al. | |
| 2013/0149606 A1* | 6/2013 | Yasuda | H01G 11/06 429/218.1 |
| 2013/0273439 A1 | 10/2013 | Tanaka et al. | |
| 2014/0110634 A1 | 4/2014 | Cho et al. | |

FOREIGN PATENT DOCUMENTS

| | | |
|---|---|---|
| JP | H05-174818 A | 7/1993 |
| JP | H06-60867 A | 3/1994 |
| JP | H10-294112 A | 11/1998 |
| JP | H11-102705 A | 4/1999 |
| JP | 2997741 B2 | 1/2000 |
| JP | 2000-215887 A | 8/2000 |
| JP | 2000-243396 A | 9/2000 |
| JP | 2002-042806 A | 2/2002 |
| JP | 2004-323284 A | 11/2004 |
| JP | 2007-305569 A | 11/2007 |
| JP | 2008-186732 A | 8/2008 |
| JP | 2012-523674 A | 10/2012 |
| JP | 2012-227154 A | 11/2012 |
| JP | 2013-055051 A | 3/2013 |
| JP | 2013-222534 A | 10/2013 |
| JP | 2013-246989 A | 12/2013 |
| JP | 2014-044899 A | 3/2014 |
| WO | 2012/018035 A1 | 2/2012 |
| WO | 2012/026067 A1 | 3/2012 |

OTHER PUBLICATIONS

Ferrari et al., "Interpretation of Raman spectra of disordered and amorphous carbon," Physical Review B, vol. 61, No. 20, May 15, 2000, pp. 14 095-14 107.
Mar. 3, 2015 International Search Report issued in International Patent Application No. PCT/JP2015/000218.
Dec. 13, 2016 Office Action issued in Japanese Patent Application No. 2014-017555.
Jul. 20, 2017 Extended Search Report issued in European Patent Application No. 15743105.7.
Sep. 5, 2017 Office Action issued in Japanese Patent Application No. 2014-017555.
Aug. 2, 2016 International Preliminary Report on Patentability issued in Patent Application No. PCT/JP2015/000218.
Jun. 1, 2018 Office Action issued in Chinese Application No. 201580006487.7.

* cited by examiner

NEGATIVE ELECTRODE MATERIAL FOR NON-AQUEOUS ELECTROLYTE SECONDARY BATTERY, METHOD OF PRODUCING NEGATIVE ELECTRODE MATERIAL FOR NON-AQUEOUS ELECTROLYTE SECONDARY BATTERY, AND NON-AQUEOUS ELECTROLYTE SECONDARY BATTERY

TECHNICAL FIELD

The present invention relates to a negative electrode material for a non-aqueous electrolyte secondary battery that has high charge and discharge capacity and good cycle performance, a method of producing the negative electrode material for a non-aqueous electrolyte secondary battery, and a non-aqueous electrolyte secondary battery, and more particularly to a lithium-ion secondary battery.

BACKGROUND ART

As mobile devices such as mobile electronic devices and mobile communication devices have highly developed, secondary batteries with higher energy density are needed to improve efficiency and reduce the size and weight of the devices. The capacity of the secondary batteries of this type can be improved by known methods: use of a negative electrode material made of an oxide of V, Si, B, Zr or Sn, or a complex oxide thereof (See Patent Documents 1 and 2); use of a negative electrode material made of a metal oxide subjected to melting and rapid cooling (See Patent Document 3); use of a negative electrode material made of a silicon oxide (See Patent Document 4); use of a negative electrode material made of $Si_2N_2O$ and $Ge_2N_2O$ (See Patent Document 5 for example), and others.

The negative electrode materials can be made conductive by known methods: performing mechanical alloying of SiO and graphite, and carbonizing the resultant (See Patent Document 6); coating silicon particles with carbon layers by chemical vapor deposition (See Patent Document 7); coating silicon oxide particles with carbon layers by chemical vapor deposition (See Patent Document 8).

Although these conventional methods increase the charge and discharge capacity and energy density to some extent, the increase is insufficient for market needs and the cycle performance fails to fulfill the needs. The conventional methods need to further improve the energy density and thus are not entirely satisfactory.

In particular, Patent Document 4 discloses use of a silicon oxide as a negative electrode material for a lithium-ion secondary battery so as to obtain an electrode with a high capacity. To the present inventor's knowledge, however, this method cannot achieve low irreversible capacity at first charging and discharging and a practical level of cycle performance, so this method can be improved on.

The methods to provide a negative electrode material with conductivity remain the following problems. The method in Patent Document 6 uses solid-state welding and thus cannot uniformly form a carbon coating, resulting in insufficient conductivity. Although the method in Patent Document 7 enables the formation of a uniform carbon coating, this method uses Si as a negative electrode material and thus reduces the cycle performance because the expansion and contraction of the material becomes too large at lithium insertion or extraction. This makes the material unsuited to practical use. The charge capacity consequently needs to be limited to avoid this problem. Although the method in Patent Document 8 enables the improvement in cycle performance, the precipitation of silicon fine crystals, the structure of a carbon coating and the combination between the carbon coating and the base are unsatisfactory. Thus, the material produced by this method is unpractical for use in secondary batteries. This material causes the batteries to gradually reduce the capacity with an increase in charging and discharging cycles and to greatly reduce the capacity after given cycles.

CITATION LIST

Patent Literature

Patent Document 1:Japanese Unexamined Patent publication (Kokai) No. H05-174818
Patent Document 2:Japanese Unexamined Patent publication (Kokai) No. H06-60867
Patent Document 3:Japanese Unexamined Patent publication (Kokai) No. H10-294112
Patent Document 4:Japanese Patent No. 2997741
Patent Document 5:Japanese Unexamined Patent publication (Kokai) No. H11-102705
Patent Document 6:Japanese Unexamined Patent publication (Kokai) No. 2000-243396
Patent Document 7:Japanese Unexamined Patent publication (Kokai) No. 2000-215887
Patent Document 8:Japanese Unexamined Patent publication (Kokai) No. 2002-42806

Non Patent Literature

Non Patent Document 1: A. C. Ferrari et al., Phys. Rev. B vol. 61, no. 20, 14095 (2000)

SUMMARY OF INVENTION

Technical Problem

The present invention was accomplished in view of the above-described problems. It is an object of the present invention to provide a negative electrode material for a non-aqueous electrolyte secondary battery that has excellent cycle performance and keeps high charge and discharge capacity due to use of a silicon-based active material, a method of producing the negative electrode material for a non-aqueous electrolyte secondary battery, and a non-aqueous electrolyte secondary battery.

Solution to Problem

To achieve this object, the present invention provides a negative electrode material for a non-aqueous electrolyte secondary battery, comprising a conductive powder composed of silicon-based active material particles coated with a conductive carbon film, wherein the conductive carbon film exhibits a d-band having a peak half width of 100 $cm^{-1}$ or more, the d-band being determined from a Raman spectrum of the conductive carbon film.

When the conductive carbon film exhibits the d-band having a peak half width of 100 $cm^{-1}$ or more, the conductive carbon film is expandable corresponding to the volume expansion of the silicon-based active material particles at charging, and inhibited from breaking. This stress relaxation effect of the conductive carbon film increases durability of a battery, and thus allows the negative electrode material for a non-aqueous electrolyte secondary battery to keep high charge and discharge capacity and have excellent cycle performance. In addition, this negative electrode material for a non-aqueous electrolyte secondary battery can reduce the amount of gas generated within the battery.

The conductive carbon film preferably satisfies a peak intensity ratio $I_d/I_g$ of 1.1 or less where $I_d$ is a peak intensity of the d-band and $I_g$ is a peak intensity of a g-band, the d-band and the g-band being determined from the Raman spectrum of the conductive carbon film.

Such a conductive carbon film contains many sp2 structures, which contribute to conductivity, thus enabling the increase in conductivity and the improvement in cycle performance.

The silicon-based active material particles are preferably particles of a silicon oxide expressed by $SiO_x$ where $0.5 \leq x < 1.6$.

Such particles of the silicon oxide can be produced at a low cost, thus enabling the negative electrode material for a non-aqueous electrolyte secondary to be produced at a low cost.

The silicon-based active material particles preferably comprise silicon fine crystals dispersed in a silicon oxide, the silicon fine crystals having a crystallite size ranging from 1 to 9 nm.

In this structure, silicon is completely amorphous and features irregular atomic arrangements. Thus, the charge and discharge capacity is prevented from decreasing, and a region that fails to contribute to charging and discharging is hardly formed in the silicon particles because of the silicon fine crystals with a crystallite size of 9 nm or less. Consequently, this structure can prevent the reduction in coulombic efficiency, defined as the ratio of discharge capacity to charge capacity.

The conductive carbon film preferably has a two-layer structure comprising a first carbon film being in contact with an outer surface of the silicon-based active material particles and a second carbon film being in contact with an outer surface of the first carbon film, the first carbon film being composed of a carbon material containing 70 mass % or more of a carbon compound having 3 or more carbon atoms, the second carbon film being composed of a carbon material containing 70 mass % or more of a carbon compound having 1 to 2 carbon atoms.

The first carbon film is excellent in conductivity within the carbon film, can reduce uncovered surface area of the silicon-based active material particles as much as possible, and allows smooth and uniform coating. The second carbon film has a large specific surface area that is advantageous for continuity due to contact between the particles. The negative electrode material for a non-aqueous electrolyte secondary battery including such conductive powder coated with the two-layered carbon film having different functions dramatically improves the cycle performance and high-temperature preservation property.

Furthermore, the present invention provides a non-aqueous electrolyte secondary battery, comprising a positive electrode containing a positive electrode active material, a negative electrode containing any one of the above negative electrode material, a separator placed between the positive electrode and the negative electrode, and a non-aqueous electrolyte containing a non-aqueous solvent and an electrolyte salt.

Such a non-aqueous electrolyte secondary battery has high charge and discharge capacity and excellent circle performance.

Furthermore, the present invention provides a method of producing a negative electrode material for a non-aqueous electrolyte secondary battery, comprising the steps of: coating silicon-based active material particles with a conductive carbon film to form a conductive powder; after the coating step, measuring a peak half width of a d-band in a Raman spectrum of the conductive carbon film in the conductive powder by Raman spectrometry; and selecting the conductive powder if the peak half width of the d-band obtained in the measuring step is 100 cm$^{-1}$ or more to use the selected conductive powder in a subsequent step.

When the peak half width of the d-band is 100 cm$^{-1}$ or more, the conductive carbon film is expandable corresponding to the volume expansion of the silicon-based active material particles at charging, and inhibited from breaking. By selecting such a conductive powder for a subsequent step, durability of a battery can be increased. Thus, this method can produce a negative electrode material for a non-aqueous electrolyte secondary battery that keeps high charge and discharge capacity and has excellent cycle performance. In addition, this method can produce a negative electrode material for a non-aqueous electrolyte secondary battery that can reduce the amount of gas generated within the battery.

The measuring step preferably includes further measuring a peak intensity $I_d$ of the d-band and a peak intensity $I_g$ of a g-band in the Raman spectrum of the conductive carbon film in the conductive powder, and the selecting step preferably includes selecting the conductive powder if a peak intensity ratio $I_d/I_g$ is 1.1 or less to use the selected conductive powder in the subsequent step.

By selecting such a conductive powder, the conductive powder containing many sp2 structures, which contribute to conductivity, can be used in the subsequent step. This allows reliable production of a negative electrode material for a non-aqueous electrolyte secondary battery that has higher conductivity and more excellent cycle performance.

The silicon-based active material particles are preferably particles of a silicon oxide expressed by $SiO_x$ where $0.5 \leq x < 1.6$.

Such particles of the silicon oxide can be produced relatively easily, thus enabling the negative electrode material for a non-aqueous electrolyte secondary to be produced at a low cost.

The silicon-based active material particles preferably comprise silicon fine crystals dispersed in a silicon oxide, the silicon fine crystals having a crystallite size ranging from 1 to 9 nm.

In this manner, the charge and discharge capacity is prevented from decreasing, and the coulombic efficiency is reliably prevented from decreasing.

The conductive carbon film preferably has a two-layer structure comprising a first carbon film being in contact with an outer surface of the silicon-based active material particles and a second carbon film being in contact with an outer surface of the first carbon film, the first carbon film being composed of a carbon material containing 70 mass % or more of a carbon compound having 3 or more carbon atoms, the second carbon film being composed of a carbon material containing 70 mass % or more of a carbon compound having 1 to 2 carbon atoms.

Use of the conductive powder coated with the two-layered carbon film having different functions allows reliable production of a negative electrode material for a non-aqueous electrolyte secondary battery having dramatically improved cycle performance and high-temperature preservation property.

Advantageous Effects of Invention

As described above, the present invention allows production of a negative electrode material for a non-aqueous electrolyte secondary battery that keeps higher charge and discharge capacity and has excellent cycle performance. The negative electrode material produced by the inventive producing method is suitable for a non-aqueous electrolyte secondary battery. The non-aqueous electrolyte secondary battery using this negative electrode material keeps high charge and discharge capacity, is excellent in cycle performance, and can reduce the amount of gas generated within the battery.

DESCRIPTION OF EMBODIMENTS

Figure 1:
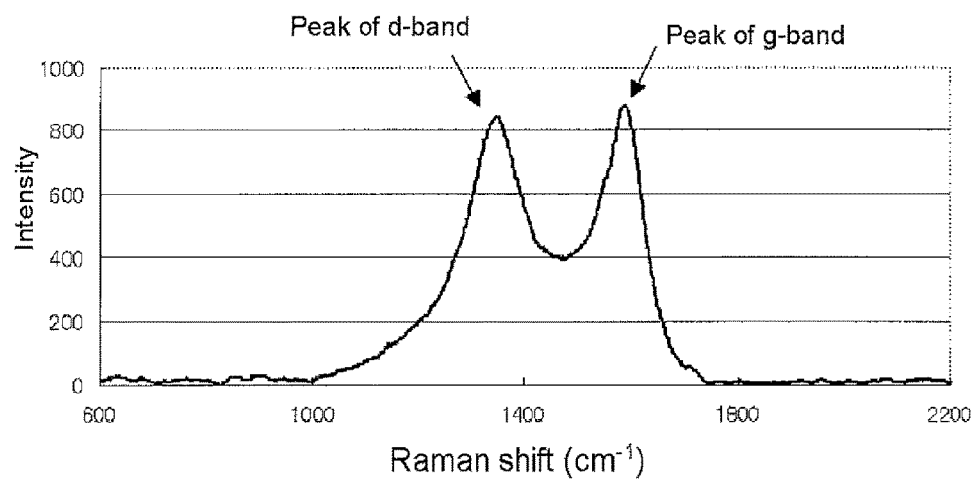
FIG. 1 is a diagram showing measurement values of a Raman spectrum measured in example 1.

Hereinafter, embodiments of the present invention will be described, but the present invention is not limited thereto.

The present inventors diligently studied to accomplish the above object, and confirmed that battery performances are significantly improved by coating particles including silicon fine crystals dispersed in a silicon compound with a carbon film. However, a simple carbon film fails to meet requirements of high charge and discharge capacity and good cycle performance. Then, the inventors conducted detailed studies to improve the performances, and found that the required battery performances can be achieved by using, in the negative electrode material for a non-aqueous electrolyte secondary battery, a conductive powder composed of silicon-based active material particles coated with a conductive carbon film, in which the conductive carbon film exhibits a d-band having a peak half width of 100 $cm^{-1}$ or more in Raman spectrum, thereby brought the invention to completion.

In the course of the studies, the inventors further evaluated battery performances of the conductive powder obtained by coating particles, including silicon fine crystals dispersed in a silicon compound, with a carbon film under various conditions, and consequently found that the battery performances vary depending on the materials. Then, they analyzed each material and found an obvious relationship between the battery performances and crystallinity of carbon. Limiting these factors to a specific range allows the negative electrode material for a non-aqueous electrolyte secondary battery to have better battery performances.

Moreover, the inventors further conducted detailed studies to further improve the performances, and consequently found that the required battery performances can be achieved by using, in the negative electrode material for a non-aqueous electrolyte secondary battery, a conductive powder in which the silicon-based active material is coated with carbon films having different film characteristics.

Hereinafter, the present invention will be described in detail, but the present invention is not limited thereto.

The present invention is directed to a negative electrode material for a non-aqueous electrolyte secondary battery that includes a conductive powder composed of silicon-based active material particles coated with a conductive carbon film, in which the silicon-based active material particles can occlude and emit lithium ions, and the conductive carbon film exhibits a d-band having a peak half width of 100 $cm^{-1}$ or more. The present invention is also directed to a method of producing the same and a non-aqueous electrolyte secondary battery using this negative electrode material.

First, the inventive negative electrode material for a non-aqueous electrolyte secondary battery will be described.
[Silicon-Based Active Material]
The silicon-based active material contained in the inventive negative electrode material for a non-aqueous electrolyte secondary battery may be silicon (a single substance of silicon) or a material containing silicon such as a silicon oxide. Use of particles of the silicon-based active material oxide makes the best of this material and allows the effects of the invention to be given.

Examples of the silicon oxide in the present invention include a silicon oxide expressed by $SiO_x$ ($0<x<2$). This silicon oxide can be obtained by, for example, heating a mixture of silicon dioxide and metallic silicon to produce a silicon oxide gas and cooling and precipitating the silicon oxide gas. The term "silicon oxide" in the present invention includes silicon oxide particles thus obtained, those etched with hydrogen fluoride or the like, a silicon dioxide or a silicon oxide subjected to a reduction treatment, and a structure in which silicon fine crystals are dispersed in a silicon oxide.

Above all, the silicon-based active material particles are preferably particles of a silicon oxide expressed by $SiO_x$ ($0.5 \leq x < 1.6$).

Such particles of the silicon oxide can be produced easily. Thus, use of the particles of this silicon oxide enables the negative electrode material for a non-aqueous electrolyte secondary to be produced at a low cost.

Physical properties of the silicon-based active material particles are appropriately determined depending on the desired composite particles. The average particle size thereof is preferably from 0.1 to 50 μm. The lower limit is more preferably 0.2 μm or more, much more preferably 0.5 μm or more. The upper limit is more preferably 30 μm or less, much more preferably 20 μm or less. It is to be noted that the average particle size in the present invention is expressed by a volume average particle size by particle size distribution measurement using laser diffractometry.

Moreover, the silicon-based active material particles contained in the inventive negative electrode material for a non-aqueous electrolyte secondary battery preferably include silicon fine crystals dispersed in a silicon oxide. The silicon-based active material particles including the silicon fine crystals dispersed in the silicon oxide preferably have a BET specific surface area of 0.5 to 100 $m^2/g$, more preferably 1 to 20 $m^2/g$.

Moreover, the silicon-based active material particles including the silicon fine crystals dispersed in the silicon oxide preferably have the following properties.

The silicon fine crystals preferably have a crystallite size ranging from 1 to 9 nm, more preferably from 1 to 8 nm, much more preferably from 1 to 7 nm; this crystallite size is calculated by the Scherrer method on the basis of a spread of a diffraction line that is attributable to Si (220) centered near $2\theta=47.5°$ in X-ray diffraction (Cu-Kα) using copper as a counter negative electrode.

The silicon-based active material particles having this structure, in which silicon is completely amorphous and features irregular atomic arrangements, prevents the charge and discharge capacity from decreasing, and hardly forms a region that fails to contribute to charging and discharging in the silicon particles because of the silicon fine crystals with a crystallite size of 9 nm or less. Thus, this structure can reliably prevent the reduction in coulombic efficiency.
[Conductive Carbon Film]
In the present invention, the conductive carbon film coating the silicon-based active material is characterized in that the peak half width Dh of the d-band is a large value of 100 cm$^{-1}$ or more. This makes structure uniformity low.

The peak half width of a d-band, the peak half width of a g-band, and the intensity ratio determined in a Raman spectrum are used as indexes of the structure of the conductive carbon film. The peak of the d-band is supposed to reflect sp3 structures and appears around 1330 to 1350 cm$^{-1}$ in Raman shift. The g-band is supposed to reflect cyclic planar structures due to sp2 hybridization and appears around 1580 to 1590 cm$^{-1}$ in Raman shift. The peak half width (Dh) of the d-band is an index of uniformity of the sp3 structures. In other words, a smaller Dh value indicates that the fine structure of sp3 carbon is more uniform and dense. On the other hand, the peak intensity ratio ($I_d/I_g$) between the peak intensity $I_d$ of the d-band and the peak intensity $I_g$ of the g-band can be also used as a value that indicates film characteristics. The conductive carbon film produced by pyrolysis of carbon materials is usually amorphous carbon. It is known that this film having a smaller ratio $I_d/I_g$ contains more sp2 carbon structures (See Non Patent Document 1).

In the present invention, the conductive carbon film coating the silicon-based active material exhibits the d-band having a peak half width of 100 cm$^{-1}$ or more. Although a larger peak half width Dh of the d-band indicates lower uniformity of the sp3 structures, the conductive carbon film used in the invention preferably has a wide range of the sp3 fine structures, which yields the stress relaxation effect. This effect makes the conductive carbon film expandable corresponding to the volume expansion of the active material particles at charging, and prevents its breakage. If the peak half width DE is less than 100 cm$^{-1}$, the relaxation effect cannot be achieved, and the conductive carbon film easily breaks due to the expansion of the active material particles, resulting in poor durability of a battery using this material. In addition, the conductive carbon film satisfying the above half width allows the negative electrode material for a non-aqueous electrolyte secondary battery to reduce the amount of gas generated within the battery.

The peak intensity ratio $I_d/I_g$ of the d-band to the g-band is preferably 1.1 or less.

When the ratio $I_d/I_g$ is 1.1 or less, sp2 structures, which is supposed to contribute to conductivity, is contained in a high amount. Thus, the conductivity is increased, and the cycle performance is improved.

Moreover, in the present invention, the conductive carbon film preferably has a two-layer structure. The two-layer structure may be formed of a first carbon film being in contact with an outer surface of the silicon-based active material particles and a second carbon film being in contact with an outer surface of the first carbon film. In this case, the first carbon film is preferably composed of a carbon material containing 70 mass % or more of a carbon compound having 3 or more carbon atoms. The second carbon film is preferably composed of a carbon material containing 70 mass % or more of a carbon compound having 1 to 2 carbon atoms.

The first carbon film is excellent in conductivity within the carbon film, can reduce uncovered surface area of the silicon-based active material particles as much as possible, and allows smooth and uniform coating. The second carbon film has a large specific surface area that is advantageous for continuity due to contact between the particles. Coating with the two-layered carbon film having different functions allows the negative electrode material for a non-aqueous electrolyte secondary battery to have dramatically improved cycle performance and high-temperature preservation property.

The inventive method of producing a negative electrode material for a non-aqueous electrolyte secondary battery will be now described below, but the inventive method is not limited thereto.

First, silicon-based active material particles are produced. The silicon-based active material particles produced may be, for example, silicon (a single substance of silicon) or a silicon oxide.

Examples of the silicon oxide include a silicon oxide expressed by $SiO_x$ (0<x<2). In particular, particles of a silicon oxide expressed by $SiO_x$ (0.5≤x<1.6) may be used.

The particles of this silicon oxide can be produced easily. Thus, use of the particles of this silicon oxide enables the negative electrode material for a non-aqueous electrolyte secondary to be produced at a low cost.

It is preferred that the silicon-based active material particles include silicon fine crystals dispersed in a silicon oxide, and the silicon fine crystals have a crystallite size ranging from 1 to 9 nm.

In this manner, the charge and discharge capacity is prevented from decreasing, and the coulombic efficiency is prevented from decreasing.

The silicon oxide in the present invention can be obtained by, for example, heating a mixture of silicon dioxide and metallic silicon to produce a silicon oxide gas and cooling and precipitating the silicon oxide gas. A material obtained by etching the resultant silicon oxide particles with hydrogen fluoride or the like, a silicon dioxide or a silicon oxide subjected to a reduction treatment, or a structure in which silicon fine crystals are dispersed in a silicon oxide may also be used as the silicon oxide in the present invention.

The produced silicon-based active material particles are then each coated with a conductive carbon film to form a conductive powder in the coating step.

In this coating step, the conductive carbon film coating the silicon-based active material particles is preferably formed by laminating two or more carbon films having different film characteristics, although it is not particularly limited thereto. Herein, a layer that is in contact with an outer surface of the silicon-based active material particles is referred to as the first carbon film, and a layer that is in contact with an outer surface of the first carbon film is referred to as the second carbon film. A method of forming each layer will be described below.

Each layer may be formed by pyrolysis (CVD) of carbon materials containing carbon. The conductive carbon films with different film characteristics can be formed by changing formation conditions or the carbon materials used for forming each layer.

First, an exemplary method of forming the first carbon film will be described.

The first carbon film is preferably a layer that is excellent in conductivity within the carbon film, can reduce uncovered surface area of the silicon-based active material particles as much as possible, and allows smooth and uniform coating.

The first carbon film can be formed by using a carbon material containing 70 mass % or more of a carbon compound having 3 or more carbon atoms. Examples of the carbon compound having 3 or more carbon atoms include a hydrocarbon gas such as propane, propylene, butane, and butadiene, an aromatic hydrocarbon of a monocycle to a tricycle such as n-hexane, cyclohexane, toluene, xylene, styrene, ethylbenzene, diphenylmethane, naphthalene, phenol, cresol, nitrobenzene, chlorobenzene, indene, coumarone, pyridine, anthracene, and phenanthrene, and a mixture thereof. In addition, a gas light oil, a creosote oil, an anthracene oil, and a naphtha-cracked tar oil that are obtained by a tar distillation process may be used singly or in combination. Furthermore, saccharide such as glucose and sucrose, carbon-based polymers such as polyimide, polyimide, and polystyrene may also be used as the carbon compound. Among them, propane, propylene, toluene, glucose, and sucrose are preferable; and propane, propylene, and toluene are more preferably used because these compounds are low in cost and easy to be carbonized. The carbon material contains the above carbon compound having 3 or more carbon atoms in an amount of at least 70 mass %, preferably 75 mass % or more, more preferably 80 mass % or more.

The first carbon film can be formed by introducing the carbon material in a pyrolysis reaction furnace in which the silicon-based active material particles have been placed, and performing pyrolysis of the introduced carbon material at 600 to 1300° C. The pyrolysis of the introduced carbon material is preferably performed at 650 to 1100° C.

In this operation, the pressure inside the pyrolysis reaction furnace may be normal pressure or a reduced pressure of 50 Pa or more. When the pressure is controlled to be 50 Pa or more, the furnace is not in high vacuum. This prevents the amount of the carbon material component in the furnace from decreasing, and thus prevents growth rate of the carbon film from decreasing. The pressure is preferably 100 Pa or more.

The second carbon film is formed by using a carbon material containing 70 mass % or more of a carbon compound having 1 to 2 carbon atoms. The carbon compound having 1 to 2 carbon atoms may be a hydrocarbon gas such as methane, ethane, ethylene, and acetylene; methane is preferable. The carbon material contains the above carbon compound having 1 or 2 carbon atoms in an amount of at least 70 mass %, preferably 75 mass % or more, more preferably 80 mass % or more.

The second carbon film can be formed by introducing the carbon material in a pyrolysis reaction furnace in which the silicon-based active material particles have been placed, and performing pyrolysis of the introduced carbon material at 700 to 1300° C. The pyrolysis of the introduced carbon material is preferably performed at 750 to 1200° C., more preferably 780 to 1100° C.

The total carbon amount of the first carbon film and the second carbon film is preferably, but not particularly limited to, in the range of 1 to 40 mass %, more preferably 2 to 30 mass %, with respect to the silicon-based active material particles. When the total carbon amount is 1 mass % or more, sufficient conductivity can be maintained, and consequently the cycle performance of a negative electrode for a non-aqueous electrolyte secondary battery containing this film can be prevented from decreasing. When the total carbon amount is 40 mass % or less, the effect of the conductive carbon film is improved, the ratio of carbon to the negative electrode material is prevented from excessively increasing, and thus the charge and discharge capacity can be prevented from decreasing in a non-aqueous electrolyte secondary battery using this negative electrode material.

Although the ratio between the first carbon film and the second carbon film in the conductive carbon film is not limited, the carbon amount of the first carbon film is preferably 40 to 99 mass %, more preferably 45 to 98 mass %, much more preferably 50 to 97 mass %, with respect to the whole carbon amount.

In the above manner, the silicon-based active material particles are coated with the conductive carbon film to form the conductive powder.

While both the first carbon film and the second carbon film are formed by chemical vapor deposition (CVD) in the above exemplary case, the present invention is not limited thereto, and the carbon film may be formed by, for example, adding the carbon materials to slurry containing the silicon-based active material and water, dissolving of the carbon materials, spray-drying, and then heating.

In addition, while the coating conductive carbon film has a two-layer structure in the above exemplary case, the present invention is, of course, not limited thereto, and the coating conductive carbon film may be a monolayer or three or more layers.

After the coating step in the present invention, the peak half width Dh of the d-band in the Raman spectrum of the conductive carbon film in the conductive powder is measured by Raman spectrometry in the measuring step.

In this measuring step, for example, a certain amount of particles of the conductive powder are randomly sampled from the base conductive powder produced in the coating step. A Raman spectrum of the conductive carbon film of the sampled particles is measured by Raman spectrometry. The measurement values of the Raman spectrum of the conductive carbon film can be measured with a Raman microscope XploRa made by HORIBA Ltd, for example. The values of the peak half width Dh of the d-band, the peak intensity $I_d$ of the d-band, the peak intensity $I_g$ of the g-band, and the peak intensity ratio $I_d/I_g$ in the measured Raman spectrum can be calculated with analysis software, LabSpec, or the like.

Then, the conductive powder is selected in the selecting step if the peak half width of the d-band obtained in the measuring step is 100 $cm^{-1}$ or more to use the selected conductive powder in a subsequent step.

In this selecting step, if the sampled particles satisfy that the peak half width Dh of the d-band obtained in the measuring step is 100 $cm^{-1}$ or more, the base conductive powder, from which the particles have been sampled, is selected to be used in a subsequent step. The selecting step is not necessarily needed in every production of the negative electrode material. Once conditions under which the peak half width of the d-band is 100 $cm^{-1}$ or more in the Raman spectrum measurement are found, future production of the negative electrode material can be performed under the found conditions.

Additionally, it is preferable to measure the peak intensity ratio $I_d/I_g$ in the measuring step, and select the conductive powder further satisfying that the peak intensity ratio $I_d/I_g$ is 1.1 or less to use the selected conductive powder in the subsequent step.

When such a conductive powder is further selected, the conductive powder containing many sp2 structures, which contribute to conductivity, can be used in the subsequent step. This allows reliable production of a negative electrode material for a non-aqueous electrolyte secondary battery that has high conductivity and more excellent cycle performance.

In the above manner, the inventive negative electrode material for a non-aqueous electrolyte secondary battery is produced.

When the particles of the conductive powder exhibit the d-band having a peak half width of 100 $cm^{-1}$ or more, the conductive carbon film is expandable corresponding to the volume expansion of the silicon-based active material particles at charging, and inhibited from breaking. By selecting such a conductive powder for a subsequent step, durability of a battery can be increased. Thus, the inventive method can produce a negative electrode material for a non-aqueous electrolyte secondary battery that keeps high charge and discharge capacity and has excellent cycle performance. In addition, this method can produce a negative electrode material for a non-aqueous electrolyte secondary battery that can reduce the amount of gas generated within the battery.

The negative electrode material for a non-aqueous electrolyte secondary battery obtained by the inventive producing method can be used to produce a negative electrode, and then manufacture a non-aqueous electrolyte secondary battery.

When the negative electrode is produced by using the inventive negative electrode material for a non-aqueous electrolyte secondary battery, the inventive negative electrode material for a non-aqueous electrolyte secondary battery can be used as a main active material to form a silicon-based active material electrode. Alternatively, a known graphite-based active material such as natural graphite or synthetic graphite can be used as the main active material and the inventive negative electrode material for a non-aqueous electrolyte secondary battery can be added thereto to form a mix electrode.

A conductive additive such as graphite may be added. The type of the conductive additive is not particularly limited; any electronic conductive material that neither decomposes nor transmutes in a battery produced with this material suffices for the conductive additive. Illustrative examples thereof include powder or fiber of metal such as Al, Ti, Fe, Ni, Cu, Zn, Ag, Sn, and Si, and graphite such as natural graphite, synthetic graphite, various types of coke powder, mesophase carbon, vapor-grown carbon fiber, pitch-based carbon fiber, polyacrylonitrile(PAN)-based carbon fiber, and various types of sintered resin.

An example of a method of preparing the negative electrode (a product) is given as follows. The inventive negative electrode material for a non-aqueous electrolyte secondary battery is mixed with a solvent such as N-methylpyrrolidone or water, together with as necessary a conductive additive and other additives such as a binder to form paste-like mixture. This mixture is applied to a sheet current collector. The current collector may be made of a material typically used for a negative electrode current collector, such as copper foil or nickel foil, which can be used without any limitation such as its thickness or surface treatment. It is to be noted that the procedure for forming the paste-like mixture into a sheet is not particularly limited; known methods may be used.

The inventive non-aqueous electrolyte secondary battery is characterized by using the inventive negative electrode material for a non-aqueous electrolyte secondary battery. Other materials for the positive electrode, the negative electrode, the non-aqueous electrolyte, and the separator, and so on, and the battery shape are not limited in particular; known materials may be used. Examples of the positive electrode active material include transition metallic oxides such as $LiCoO_2$, $LiNiO_2$, $LiMn_2O_4$, $V_2O_5$, $MnO_2$, $TiS_2$, and $MoS_2$, lithium compounds, and chalcogen compounds. Examples of the non-aqueous electrolyte include a non-aqueous solution containing lithium salt such as lithium hexafluorophosphate and lithium perchlorate. Examples of the non-aqueous solvent include propylene carbonate, ethylene carbonate, diethyl carbonate, dimethoxyethane, γ-butyrolactone, 2-methyltetrahydrofuran, and a mixture thereof. In particular, the non-aqueous solvent preferably contains cyclic carbonate and chain carbonate. In addition to these, various solid electrolytes and other non-aqueous electrolytes may be used.

EXAMPLE

The present invention will be more specifically described below with reference to examples and comparative examples, but the invention is not limited thereto.

Example 1

300 g of silicon oxide particles expressed by $SiO_x$ (x=0.98) with an average particle size of 8 μm were placed into a heating furnace. The interior of the furnace was purged with nitrogen, heated and maintained at 850° C. Then, toluene was vaporized with a vaporizing apparatus and introduced as the carbon material at 1 g/min by using a nitrogen gas as a carrier gas to perform a carbon coating process for 1 hour. Consequently, 315 g of conductive powder A having a first carbon film alone was obtained. Conductive powder A exhibited a carbon amount of 4.6 mass % with respect to the silicon oxide particles, a peak intensity ratio $I_d/I_g$ of 0.98, and a peak half width Dh of the d-band of 144 $cm^{-1}$, as determined from a Raman spectrum (measured with an apparatus, Raman microscope XploRa made by HORIBA Ltd, and calculated with analysis software, LabSpec). In addition, silicon crystals dispersed in the silicon oxide had a crystallite size of 3.2 nm, as calculated on the basis of a spread of a diffraction line in X-ray diffraction (Cu-Kα). FIG. 1 shows measurement values of the Raman spectrum of conductive powder A.

The obtained conductive powder A was used as the negative electrode active material to produce an electrode and then a battery of coin type, and battery evaluation and gas generation evaluation were performed as follows. The result is given in Table 1.

Example 2

300 g of conductive powder A produced in example 1 was put into the heating furnace again. After the pressure inside the furnace was reduced to 100 Pa or less, the furnace was heated and maintained at 1000° C. Then, a methane gas was introduced as the carbon material at 4 NL/min to perform a carbon coating process for 1 hour. Consequently, 304 g of conductive powder B in which a second carbon film was formed on the first carbon film was obtained. Conductive powder B exhibited a carbon amount of 5.8 mass % with respect to the silicon oxide particles, a peak intensity ratio $I_d/I_g$ of 1.02, and a peak half width Dh of the d-band of 113 $cm^{-1}$, as determined from a Raman spectrum of the whole carbon film including the first and second carbon films. In addition, silicon crystals dispersed in the silicon oxide had a crystallite size of 4.4 nm, as calculated on the basis of a spread of a diffraction line in X-ray diffraction (Cu-Kα).

The obtained conductive powder B was used as the negative electrode active material to produce an electrode and then a battery of coin type, and battery evaluation and gas generation evaluation were performed as follows. The result is given in Table 1.

Comparative Example 1

Figure 2:
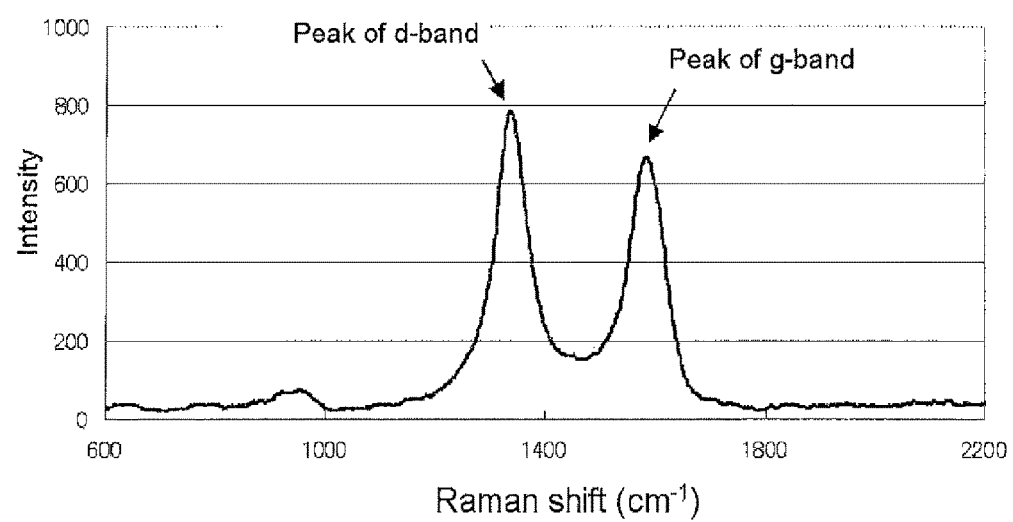
FIG. 2 is a diagram showing measurement values of a Raman spectrum measured in comparative example 1.

300 g of silicon oxide particles expressed by $SiO_x$ (x=0.98) with an average particle size of 8 μm were placed into a heating furnace. After the pressure inside the furnace was reduced to 100 Pa or less, the furnace was heated and maintained at 1150° C. Then, a methane gas was introduced as the carbon material at 4 NL/min to perform a carbon coating process for 5 hours. Consequently, 316 g of conductive powder C having a carbon film was obtained. Conductive powder C exhibited a carbon amount of 5.1 mass % with respect to the silicon oxide particles, a peak intensity ratio $I_d/I_g$ of 1.24, and a peak half width Dh of the d-band of 75 cm$^{-1}$, as determined from a Raman spectrum. In addition, silicon crystals dispersed in the silicon oxide had a crystallite size of 11 nm, as calculated on the basis of a spread of a diffraction line in X-ray diffraction (Cu-Kα). FIG. 2 shows measurement values of the Raman spectrum of conductive powder C.

The obtained conductive powder C was used as the negative electrode active material to produce an electrode and then a battery of coin type, and battery evaluation and gas generation evaluation were performed as follows. The result is given in Table 1.

Example 3

300 g of silicon oxide particles expressed by SiO$_x$ (x=1.02) with an average particle size of 5 μm were placed into a heating furnace. The interior of the furnace was purged with nitrogen, heated and maintained at 900° C. Then, propane was introduced as the carbon material at 3 NL/min to perform a carbon coating process for 5 hours at 3000 Pa. A first carbon film was thereby formed. Thereafter, the introduction of propane was stopped, the pressure was reduced to 100 Pa, and the furnace was heated and maintained at 1000° C. Then, a methane gas was introduced at 3 NL/min to perform another carbon coating process for 2 hours at 3000 Pa. Consequently, 318 g of conductive powder D in which a second carbon film was formed was obtained.

Conductive powder D exhibited a carbon amount of 5.6 mass % with respect to the silicon oxide particles, a peak intensity ratio $I_d/I_g$ of 0.88, and a peak half width Dh of the d-band of 137 cm$^{-1}$, as determined from a Raman spectrum. In addition, silicon crystals dispersed in the silicon oxide had a crystallite size of 5.5 nm, as calculated on the basis of a spread of a diffraction line in X-ray diffraction (Cu-Kα).

The obtained conductive powder D was used as the negative electrode active material to produce an electrode and then a battery of coin type, and battery evaluation and gas generation evaluation were performed as follows. The result is given in Table 1.

Example 4

40 g of silicon oxide particles expressed by SiO$_x$ (x=1.01) with an average particle size of 6 μm was mixed with 160 g of water to form slurry, and 8 g of sucrose as the carbon material was added and dissolved in the slurry. The slurry was then spray-dried to obtain silicon oxide particles coated with sucrose. The particles were placed into a heating furnace, and the furnace was heated and maintained at 700° C. for 10 hours under an argon atmosphere. A first carbon film was thereby formed.

After forming the first carbon film, the pressure inside the heating furnace was reduced to 100 Pa or less without cooling, and the furnace was heated and maintained at 1100° C. Then, a mixed gas of methane and ethane (92:8 mass % ratio) was introduced at 5 NL/min to perform a carbon coating process for 2 hours at 2000 Pa. Consequently, 321 g of conductive powder E was obtained.

Conductive powder E exhibited a carbon amount of 6.6 mass % with respect to the silicon oxide particles, a peak intensity ratio $I_d/I_g$ of 0.91, and a peak half width Dh of the d-band of 107 cm$^{-1}$, as determined from a Raman spectrum. In addition, silicon crystals dispersed in the silicon oxide had a crystallite size of 7.5 nm, as calculated on the basis of a spread of a diffraction line in X-ray diffraction (Cu-Kα).

The obtained conductive powder E was used as the negative electrode active material to produce an electrode and then a battery of coin type, and battery evaluation and gas generation evaluation were performed as follows. The result is given in Table 1.

Comparative Example 2

300 g of silicon oxide particles expressed by SiO$_x$ (x=1.01) with an average particle size of 6 μm were placed into a heating furnace. After the pressure inside the furnace was reduced to 100 Pa or less, the furnace was heated and maintained at 1050° C. Then, a mixed gas of methane and ethane (92:8 mass % ratio) was introduced at 5 NL/min to perform a carbon coating process for 2 hours. Consequently, 313 g of conductive powder F having a carbon film was obtained. This powder exhibited a carbon amount of 4.1 mass % with respect to the silicon oxide particles, a peak intensity ratio $I_d/I_g$ of 1.12, and a peak half width Dh of the d-band of 82 cm$^{-1}$, as determined from a Raman spectrum. In addition, silicon crystals dispersed in the silicon oxide had a crystallite size of 6.5 nm, as calculated on the basis of a spread of a diffraction line in X-ray diffraction (Cu-Kα).

The obtained conductive powder F was used as the negative electrode active material to produce an electrode and then a battery of coin type, and battery evaluation and gas generation evaluation were performed as follows. The result is given in Table 1.

Comparative Example 3

300 g of silicon oxide particles expressed by SiO$_x$ (x=0.98) with an average particle size of 8 μm were placed into a heating furnace. After the pressure inside the furnace was reduced to 100 Pa or less, the furnace was heated and maintained at 1200° C. Then, a methane gas was introduced as a carbon precursor at 3 NL/min to perform a carbon coating process for 8 hours. Consequently, 325 g of powder G having a carbon film was obtained. This powder exhibited a carbon amount of 8.2 mass % with respect to the silicon oxide particles, a peak intensity ratio $I_d/I_g$ of 1.15, and a peak half width Dh of the d-band of 98 cm$^{-1}$, as determined from a Raman spectrum. In addition, silicon crystals dispersed in the silicon oxide had a crystallite size of 12 nm, as calculated on the basis of a spread of a diffraction line in X-ray diffraction (Cu-Kα).

The obtained conductive powder H was used as the negative electrode active material to produce an electrode and then a battery of coin type, and battery evaluation and gas generation evaluation were performed as follows. The result is given in Table 1.

<Production of Electrodes>

N-methylpyrrolidone was added to a mixture of 90 mass % of the negative electrode material obtained in examples and comparative examples and 10 mass % of polyimide (Rikacoat SN-20 made by New Japan Chemical Co., Ltd.) in terms of solids to form a slurry. This slurry was applied to a surface of copper foil 11 μm thick and dried at 100° C. for 30 minutes. The resultant foil was pressed with a roller press to form an electrode. The electrode was dried under a vacuum at 300° C. for 2 hours. The electrode was then cut into a 2-cm$^2$ circular negative electrode.

Moreover, N-methylpyrrolidone was added to a mixture of 94 mass % of lithium cobalt oxide, 3 mass % of acetylene black, and 3 mass % of polyvinylidene fluoride to form a slurry. This slurry was applied to aluminum foil 16 μm thick and dried at 100° C. for 1 hour. The resultant foil was pressed with a roller press to form an electrode. The electrode was dried under a vacuum at 120° C. for 5 hours. The electrode was then cut into a 2-cm² circular positive electrode.

<Production of Battery of Coin Type>

Next, an evaluation lithium-ion secondary battery of coin type was produced by using the produced positive and negative electrodes, a non-aqueous electrolyte composed of a mixed solution having an ethylene carbonate-to-diethyl carbonate volume ratio of 1:1 and 1 mol/L of $LiPF_6$ dissolved in the solution, and a separator 20 μm thick made of a polyethylene microporous film.

<Battery Evaluation>

The produced lithium-ion secondary battery of coin type was left at room temperature overnight, and then charged and discharged with a secondary battery charging and discharging tester (made by NAGANO K.K). The battery was first charged with a constant current of 0.5 CmA until the voltage of the test cell reached 4.2V. After this voltage reached 4.2V, the charging was continued while the current was decreased such that the voltage of the test cell kept 4.2V until the current was decreased to about 0.1 CmA. The battery was discharged with a constant current of about 0.5 CmA. When the voltage of the cell reached 2.5V, the discharging was terminated. In this manner, first charge and discharge capacity and first charge and discharge efficiency were obtained.

This charging and discharging test was repeated to evaluate the lithium-ion secondary battery after 100 cycles. The evaluation criteria are as follows.

A: The discharge capacity retention rate is 85% or more.
B: The discharge capacity retention rate is 75% or more and less than 85%.
C: The discharge capacity retention rate is 65% or more and less than 75%.
D: The discharge capacity retention rate is less than 65%.

<Gas Generation Evaluation>

1.0 g of the negative electrode material particles produced in examples 1 to 4 and comparative examples 1 to 3 and 1.0 g of an electrolyte composed of a mixed solution with EC:DEC=1:1 containing 1M $LiPF_6$ were put into a dedicated vial of a headspace gas chromatography (GC: 6890N, headspace: 7697A, made by Agilent technologies Inc.) in a drying room with a dew point of −50° C. or lower and sealed.

This vial was stored at 60° C. for 1 week, set to the headspace gas chromatography, and measured with 1-mL injection amount. Then, the volume of generated gas was calculated in accordance with a calibration curve prepared with a standard sample. The evaluation criteria are as follows.

A: The volume is less than 2.0 mL.
B: The volume is 2.0 mL or more and less than 3.5 mL
C: The volume is 3.5 mL or more and less than 5.0 mL.
D: The volume is 5.0 mL or more.

The results of examples and comparative examples are summarized in Table 1.

TABLE 1

| | Conductive powder | $SiO_x$ Average particle size [μm] | x | First carbon film Formation temperature | Carbon material | Carbon amount [wt %] | Dh [cm⁻¹] | $I_d/I_g$ | Second carbon film Formation temperature | Carbon material |
|---|---|---|---|---|---|---|---|---|---|---|
| Example 1 | A | 8 | 0.98 | 850° C. | toluene | 4.6 | 144 | 0.98 | — | — |
| Example 2 | B | 8 | 0.98 | 850° C. | toluene | 4.6 | 166 | 0.98 | 1000° C. | methane |
| Comparative Example 1 | C | 8 | 0.98 | 1150° C. | methane | 5.1 | 75 | 1.24 | — | — |
| Example 3 | D | 5 | 1.02 | 900° C. | propane | — | — | — | 1000° C. | methane |
| Example 4 | E | 6 | 1.01 | 700° C. | sucrose | — | — | — | 1100° C. | methane-ethane mixed gas |
| Comparative Example 2 | F | 6 | 1.01 | 1050° C. | methane-ethane mixed gas | 4.1 | 82 | 1.12 | — | — |
| Comparative Example 3 | G | 8 | 0.98 | 1200° C. | methane | 8.2 | 98 | 1.15 | — | — |

| | First carbon film + Second carbon film Carbon amount [wt %] | Dh [cm⁻¹] | $I_d/I_g$ | Crystallite size [nm] | Battery test Cycle | Gas generation |
|---|---|---|---|---|---|---|
| Example 1 | — | — | — | 3.2 | A | A |
| Example 2 | 5.8 | 113 | 1.02 | 4.4 | A | A |
| Comparative Example 1 | — | — | — | 11.0 | C | C |
| Example 3 | 5.6 | 137 | 0.88 | 5.5 | A | A |
| Example 4 | 6.6 | 107 | 0.91 | 7.5 | A | A |
| Comparative Example 2 | — | — | — | 6.5 | D | C |
| Comparative Example 3 | — | — | — | 12 | D | D |

As shown in Table 1, it was confirmed that all the lithium-ion secondary batteries in examples 1 to 4 had excellent cycle performance, and generated little gas.

By contrast, the batteries in comparative examples 1 to 3 had lower cycle performance, and generated more gas than those in examples 1 to 4.

It was thus confirmed that the non-aqueous electrolyte secondary battery using the negative electrode material produced according to the present invention had excellent cycle performance and generated little gas.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode material for a non-aqueous electrolyte secondary battery, comprising a conductive powder composed of silicon-based active material particles coated with a conductive carbon film, wherein
the conductive carbon film exhibit a d-band having a peak half width of 100 cm$^{-1}$ or more, the d-band being determined from a Raman spectrum of the conductive carbon film, the silicon-based active material particles are particles of a silicon oxide expressed by $SiO_x$ where $0.5 \leq x \leq 1.6$,
the silicon-based active material particles comprise silicon fine crystals dispersed in a silicon oxide, the silicon fine crystals having a crystallite size ranging from 1 to 9 nm, and
the conductive carbon film has a two-layer structure comprising a first carbon film being in contact with an outer surface of the silicon-based active material particles and a second carbon film being in contact with an outer surface of the first carbon film, the first carbon film being composed of a carbon material containing 70 mass % or more of a carbon compound having 3 or more carbon atoms, the second carbon film being composed of a carbon material containing 70 mass % or more of a carbon compound having 1 to 2 carbon atoms, wherein
the total carbon amount of the first carbon film and the second carbon film is in the range of 1 to 40 mass % with respect to the silicon-based active material particles.

2. The negative electrode material for a non-aqueous electrolyte secondary battery according to claim 1, wherein the conductive carbon film satisfies a peak intensity ratio $I_d/I_g$ of 1.1 or less where $I_d$ is a peak intensity of the d-band and $I_g$ is a peak intensity of a g-band, the d-band and the g-band being determined from the Raman spectrum of the conductive carbon film.

3. A non-aqueous electrolyte secondary battery, comprising a positive electrode containing a positive electrode active material, a negative electrode containing a negative electrode material according to claim 1, a separator placed between the positive electrode and the negative electrode, and a non-aqueous electrolyte containing a non-aqueous solvent and an electrolyte salt.

4. A non-aqueous electrolyte secondary battery, comprising a positive electrode containing a positive electrode active material, a negative electrode containing a negative electrode material according to claim 2, a separator placed between the positive electrode and the negative electrode, and a non-aqueous electrolyte containing a non-aqueous solvent and an electrolyte salt.

5. The negative electrode material for a non-aqueous electrolyte secondary battery according to claim 1, wherein the first carbon compound is an aromatic compound.

6. The negative electrode material for a non-aqueous electrolyte secondary battery according to claim 5, wherein the aromatic compound is at least one selected from the group consisting of toluene, xylene, styrene, ethylbenzene, diphenylmethane, naphthalene, phenol, cresol, nitrobenzene, chlorobenzene, indene, coumarone, pyridine, anthracene, phenanthrene, and polystyrene.

7. The negative electrode material for a non-aqueous electrolyte secondary battery according to claim 6, wherein the aromatic compound is toluene.

* * * * *